United States Patent
Lee et al.

(10) Patent No.: US 11,501,119 B2
(45) Date of Patent: Nov. 15, 2022

(54) APPARATUS AND METHOD FOR IDENTIFYING WARSHIP

(71) Applicant: ELECTRONICS AND TELECOMMUNICATIONS RESEARCH INSTITUTE, Daejeon (KR)

(72) Inventors: Jiwon Lee, Daejeon (KR); Do-Won Nam, Daejeon (KR); Sung-Won Moon, Daejeon (KR); Ah Reum Oh, Daejeon (KR); Jung Soo Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/165,212

(22) Filed: Feb. 2, 2021

(65) Prior Publication Data

US 2021/0264194 A1 Aug. 26, 2021

(30) Foreign Application Priority Data

Feb. 24, 2020 (KR) .................. 10-2020-0022249
Jan. 4, 2021 (KR) .................. 10-2021-0000186

(51) Int. Cl.
*G06T 7/70* (2017.01)
*G06K 9/62* (2022.01)
(Continued)

(52) U.S. Cl.
CPC .......... *G06K 9/627* (2013.01); *G06K 9/6215* (2013.01); *G06K 9/6228* (2013.01);
(Continued)

(58) Field of Classification Search
None
See application file for complete search history.

(56) References Cited

U.S. PATENT DOCUMENTS

| 8,437,554 B2 | 5/2013 | Kim et al. |
| 2009/0184865 A1* | 7/2009 | Vaio ...................... G06V 10/752 342/25 F |

(Continued)

FOREIGN PATENT DOCUMENTS

| JP | 2017-126150 A | 7/2017 |
| JP | 2020-003379 A | 1/2020 |

(Continued)

OTHER PUBLICATIONS

Knapskog ("Automatic Classification of Ships in ISAR images Using Wire-Frame Models") EUSAR 2006—6th European Conference on Synthetic Aperture Radar, May 16, 2006-May 18, 2006 in Dresden, Germany (Year: 2006).*

(Continued)

*Primary Examiner* — Yanna Wu
(74) *Attorney, Agent, or Firm* — LRK Patent Law Firm

(57) ABSTRACT

An apparatus for identifying a warship receives a warship image, estimates a photographing angle and a photographing altitude of the warship from the real warship image, generates virtual warship images from stored virtual warship models based on the estimated photographing angle and photographing altitude, generates virtual warship part images in which main parts are classified and displayed for each of the virtual warship images, generates a part segmentation image in which main parts are classified and displayed for the real warship image, and outputs a type and class identification result of the warship by calculating similarity between each virtual warship part image and the part segmentation image.

11 Claims, 7 Drawing Sheets

(51) Int. Cl.
*G06T 11/00* (2006.01)
*G06V 10/75* (2022.01)

(52) U.S. Cl.
CPC .............. *G06K 9/6261* (2013.01); *G06T 7/70* (2017.01); *G06T 11/001* (2013.01); *G06V 10/751* (2022.01); *G06T 2207/20081* (2013.01)

(56) References Cited

U.S. PATENT DOCUMENTS

2019/0164301 A1    5/2019  Kim
2019/0361116 A1   11/2019  Lee
2021/0397893 A1*  12/2021  Mohrdieck .......... G06K 9/6231

FOREIGN PATENT DOCUMENTS

| KR | 10-1189167 B1    | 10/2012 |
| KR | 10-1379636 B1    | 4/2014  |
| KR | 10-2015-0075505 A | 7/2015  |
| KR | 10-2016-0019023 A | 2/2016  |
| KR | 10-1736899 B1    | 5/2017  |
| KR | 10-2021-0028941 A | 3/2021  |

OTHER PUBLICATIONS

Ji-Wei Zhu et al., "An Improved Shape Contexts Based Ship Classification in SAR Images", Remote Sens. 2017, 9, 145; doi:10.3390/rs9020145.

* cited by examiner

APPARATUS AND METHOD FOR IDENTIFYING WARSHIP

CROSS-REFERENCE TO RELATED APPLICATIONS

This application claims priority to and the benefit of Korean Patent Application Nos. 10-2020-0022249, and 10-2021-0000186 filed in the Korean Intellectual Property Office on Feb. 24, 2020, and on Jan. 4, 2021, respectively, the entire contents of which are incorporated herein by reference.

BACKGROUND OF THE INVENTION

1. Field of the Invention

The present invention relates to a method and apparatus for identifying a warship. More particularly, the resent invention relates to a method and apparatus for identifying a warship for estimating a photographing angle and photographing altitude from a photographed warship image, and identifying a type and class level of the photographed warship based on the estimated result.

2. Description of Related Art

In operating ships, coast guard posts, and control centers, a method is needed to check information, position, and speed of nearby ships for various purposes, such as traffic control or support for marine accidents. For this, an automatic identification system (AIS) or V-Pass, which can transmit and receive the position information of the ship through wireless communication, is being used. However, there are cases in which wireless communication alone does not sufficiently acquire information about nearby ships, such as when the communication device does not exist or is broken, or is intentionally turned off so that the other party does not detect it in a situation. To compensate for this situation, technologies for recognizing nearby ships based on images taken on board have been proposed.

Existing ship recognition technologies can identify the type of ship recognized based on the image, but do not support detailed identification according to class within one ship type.

In general, it is possible to fully utilize only the ship type classification, but in special cases such as military purposes, ship class classification is also necessary. For example, even if the warship (combat ship) is identified, the warship is divided into a plurality of types in detail according to the purpose, such as destroyer, cruiser, and patrol combat corvette, and one warship type is divided into a plurality of classes according to size or displacement. For example, in the case of the Korean Navy, destroyers are divided into the plurality of classes according to their displacement, such as King Sejong, King Yi Sun-shin, King Gwanggaeto, etc.

As described above, warships of different types and classes have different weapon systems, so tactical response is possible only when it is possible to identify not only the type level of the ship, but also the type and class level of the warship in order to properly respond in wartime or military operation situations. However, warships are generally similar in color and have a very high external similarity between warships of the same type, so if the warship type and class are determined only by the external features like the existing ship identification technique, the probability of erroneous identification increases.

SUMMARY OF THE INVENTION

The present invention has been made in an effort to provide a method and apparatus for identifying a warship capable of more accurately identifying the type and class information of a corresponding warship from a real warship image.

According to an embodiment of the present invention, a method of identifying a warship in an apparatus for identifying a warship is provided. The method of identifying a warship includes: receiving a warship image; estimating photographing angle and photographing altitude of the warship from the real warship image; generating virtual warship images from stored virtual warship models based on the estimated photographing angle and photographing altitude; generating virtual warship part images in which main parts are classified and displayed for each of the virtual warship images; generating a part segmentation image in which main parts are classified and displayed for the real warship image; and outputting a type and class identification result of the warship by calculating similarity between each virtual warship part image and the part segmentation image.

The generating of the virtual warship images may include generating two-dimensional virtual warship images corresponding to the estimated photographing angle and photographing altitude by applying the estimated photographing angle and photographing altitude to three-dimensional virtual warship models.

The estimating includes estimating ranges of photographing angle and photographing altitude of the warship from the real warship image using a learned model.

The generating of the part segmentation image may include generating the part segmentation image by identifying main parts in the real warship image using a learned part segmentation model.

The generating the part segmentation image by identifying main parts may include identifying only a warship area from the real warship image; identifying the main parts in the warship area; and displaying the main parts to be distinguished.

The displaying may include representing the main parts in different colors.

The output may include: calculating similarity by comparing feature information for each main part between each virtual warship part image and the part segmentation image; and outputting type and class information of the warship corresponding to at least one virtual warship part image having a similarity greater than or equal to a predetermined similarity.

The feature information may include position relationship information.

According to another embodiment of the present invention, an apparatus for identify a warship is provided. The apparatus for identify a warship includes: a photographing direction estimator that estimates an angle and altitude at which the warship is photographed from a real warship image; a virtual image inference unit that generates a two-dimensional virtual warship image set by applying the estimated angle and altitude to a pre-made three-dimensional warship model set; and a similarity calculator that calculates similarities between the real warship image and each virtual warship image of the virtual warship image set, and outputs type and class information of the warship identified from the virtual warship image having a similarity greater than or equal to a predetermined similarity.

The apparatus for identify a warship may further include a part recognition unit that generates a part segmentation image in which the main parts in the real warship image are classified and displayed, and the similarity calculator may calculate the similarity by analyzing the positional relationship information for each main part between the part segmentation image and virtual warship part images in which main parts are classified displayed for each virtual warship image.

The parts recognition unit may identify the main parts in the real warship image by using the learned part segmentation model, and represents the main parts to be distinguished.

The photographing direction estimator may estimate the angle and altitude at which the warship is photographed from the real warship image using a learned model.

DETAILED DESCRIPTION OF THE EMBODIMENTS

Figure 1:
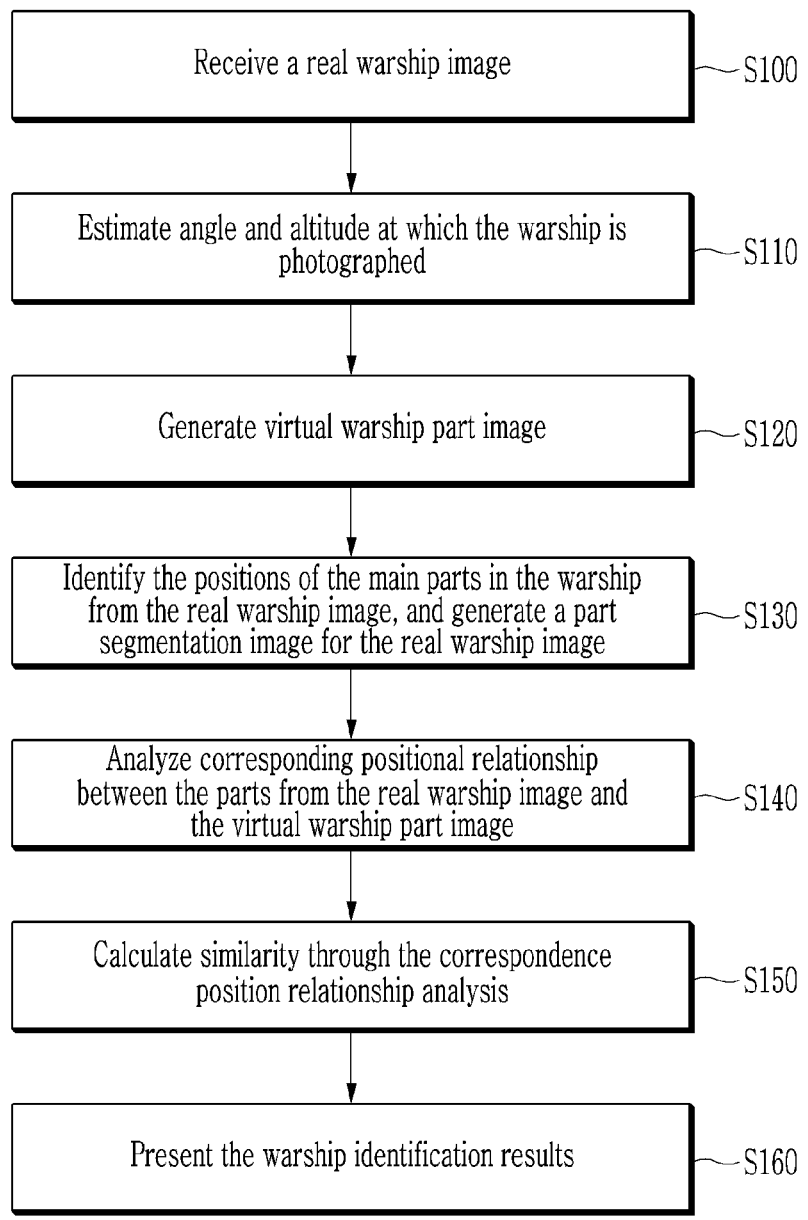
FIG. 1 is a flowchart illustrating a method for identifying a warship according to an embodiment of the present invention.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a method and apparatus for identifying a ship according to embodiments of the present invention will be described in detail with reference to the accompanying drawings.

FIG. 1 is a flowchart illustrating a method for identifying a warship according to an embodiment of the present invention.

Referring to FIG. 1, the apparatus for identifying a warship receives a real warship image (S100).

The apparatus for identifying a warship estimates an angle and altitude at which the warship is photographed from the real warship image (S110).

The apparatus for identifying a warship generates a 2D virtual warship part image from a 3-dimension (3D) virtual warship models already stored based on the photographing angle and photographing altitude estimated from the real warship image (S120). Parts represent sub-elements of an object.

The apparatus for identifying a warship identifies the positions of the main parts in the warship from the real warship image through the part segmentation technology of the object, and generates a part segmentation image for the real warship image based on the part identification result (S130).

The apparatus for identifying a warship analyzes the corresponding positional relationship between the parts from the real warship image and the virtual warship part image (S140), and calculates the similarity between the real warship and the virtual warship through the correspondence position relationship analysis (S150).

The apparatus for identifying a warship presents the warship identification results to the user through similarity measurement (S160). The apparatus for identifying a warship may present an identification result for the warship having the highest similarity. The apparatus for identifying a warship may present an identification result for a warship having a similarity greater than or equal to a set threshold.

Figure 2:
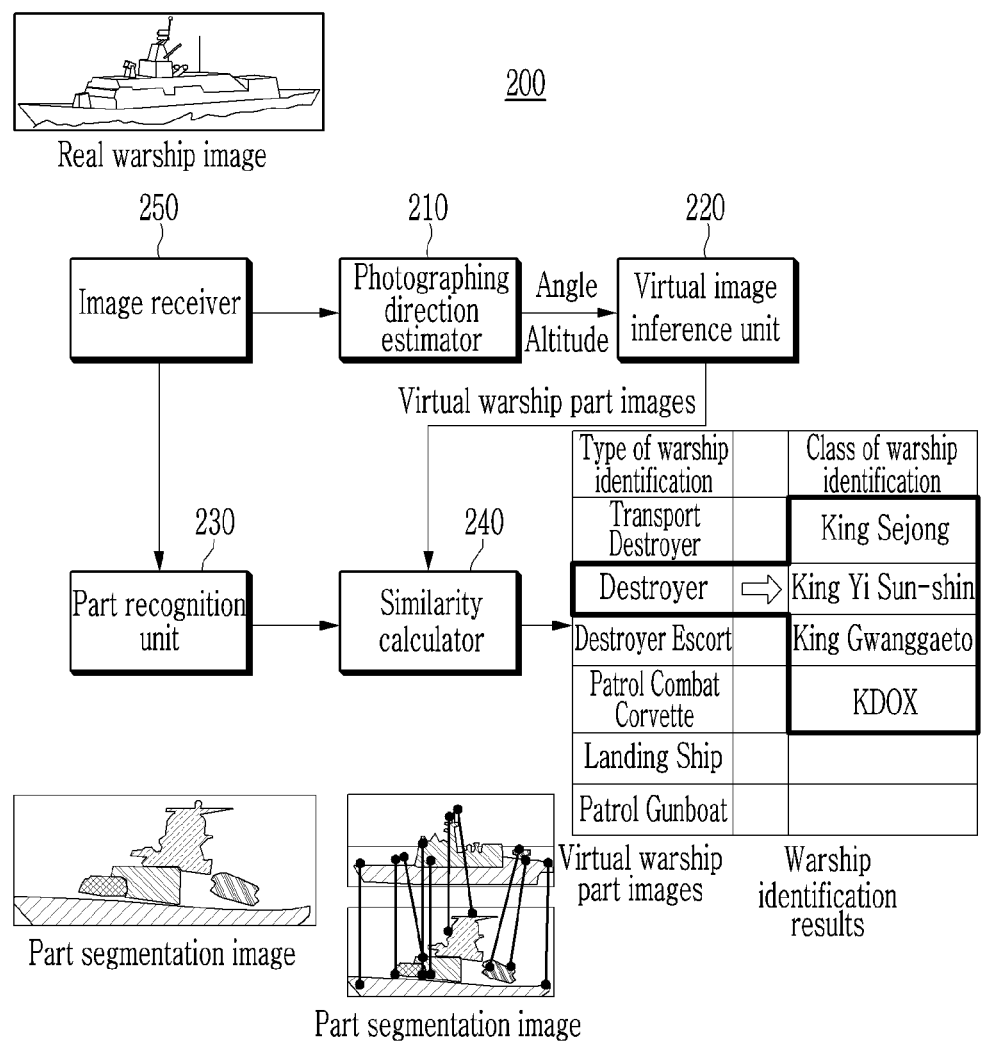
FIG. 2 is a diagram illustrating an apparatus for identifying a warship according to an embodiment of the present invention.

FIG. 2 is a diagram illustrating an apparatus for identifying a warship according to an embodiment of the present invention.

Referring to FIG. 2, the apparatus for identifying a warship 200 includes a photographing direction estimator 210, a virtual image inference unit 220, a part recognition unit 230, and a similarity calculator 240. The apparatus for identifying a warship 200 may further include an image receiver 250.

The photographed real warship image is transmitted to the photographing direction estimator 210 and the part recognition unit 230. The real warship image is input to the image receiver 250, and the real warship image received in the image receiver 250 may be transmitted to the photographing direction estimator 210 and the part recognition unit 230.

The photographing direction estimator 210 estimates the photographing angle and photographing altitude at which the warship is photographed from the real warship image using an image processing technique or a deep learning technique. The estimated photographing angle and photographing altitude information are transmitted to the virtual image inference unit 220.

The virtual image inference unit 220 derives a virtual warship image set having a shape similar to the real warship image by applying the photographing angle and photographing altitude of the warship received from the photographing direction estimator 210 to a pre-made 3D warship model set. The 3D warship model set may include 3D warship images generated through an image of each warship and specifications. The virtual image inference unit 220 generates a set of virtual warship part images in which the main parts of each virtual warship of the virtual warship image set are classified and expressed. The information of the set of virtual warship part images is transmitted to the similarity calculator 240.

The part recognition unit 230 identifies main parts of the warship in the real warship image through a deep learning-based part segmentation technique, and generates a part segmentation image for the real warship image based on the part identification result. The part segmentation image of the generated real warship image is transmitted to the similarity calculator 240.

The similarity calculator 240 calculates the similarity between each virtual warship part images received from the virtual image inference unit 220 and the part segmentation image of the real warship received from the part recognition unit 230.

The similarity calculator 240 may calculate the similarity between the two images by analyzing a correspondence position relationship between detailed elements of each virtual warship part image of the virtual warship part image set and detailed elements of the part segmentation image of the real warship. Corresponding positional relationship analysis may be performed through comparison of feature points.

The similarity calculator 240 outputs a warship identification result based on the similarity calculation result. The similarity calculator 240 presents type and class information for a plurality of warships having high similarity to the user in the order of similarity. At this time, since the input virtual warship image and the real warship image have similar angles and altitude, the similarity calculator 240 may use similarity calculation techniques based on the traditional pattern matching, such as a scale invariant feature transform (SIFT), speeded up robust features (SURF), or a Histogram of Oriented Gradients (HoG) to calculate the similarity. In addition, if the level of detail (LoD) of the model is high according to the completeness of the 3D virtual warship model, and all detailed components of the real warship are expressed, since the function of the part recognition unit 230 may be omitted, it is possible to calculate the similarity faster by comparing the feature points of the virtual warship image set and the real warship image immediately.

The user who receives the type and class information for a plurality of (for example, n) warships finally decides the type and class of the warship.

As described above, since the method of calculating the similarity of warships through pattern matching is similar to the method of classifying similar objects by humans in general, and the type and ship identification results of the warship are used for military and tactical purposes, the presenting multiple candidates, that is, type and class information for the plurality of warships, helps an expert make a determination, and it may be safe to finally identify among multiple candidates by an expert.

Figure 3:
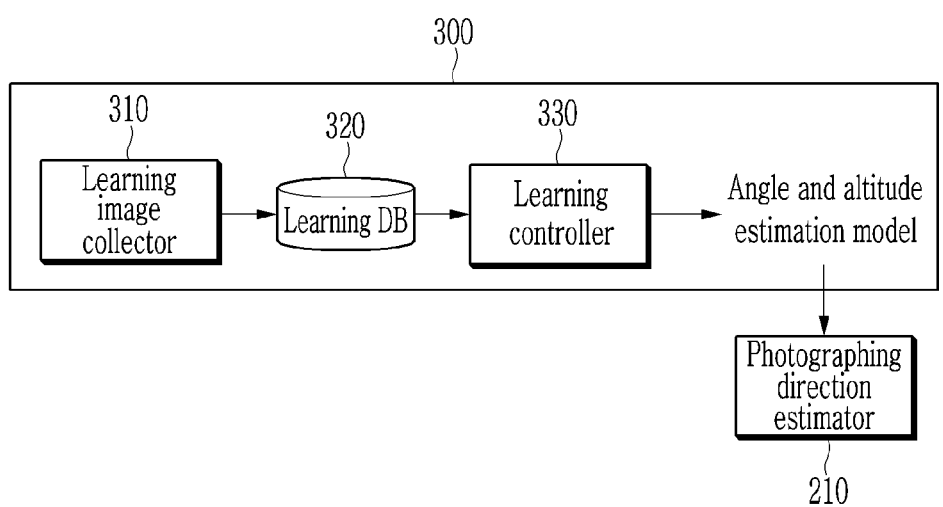
FIG. 3 is a diagram illustrating a learning apparatus for estimating an angle and altitude according to an embodiment of the present invention.
Figure 4:
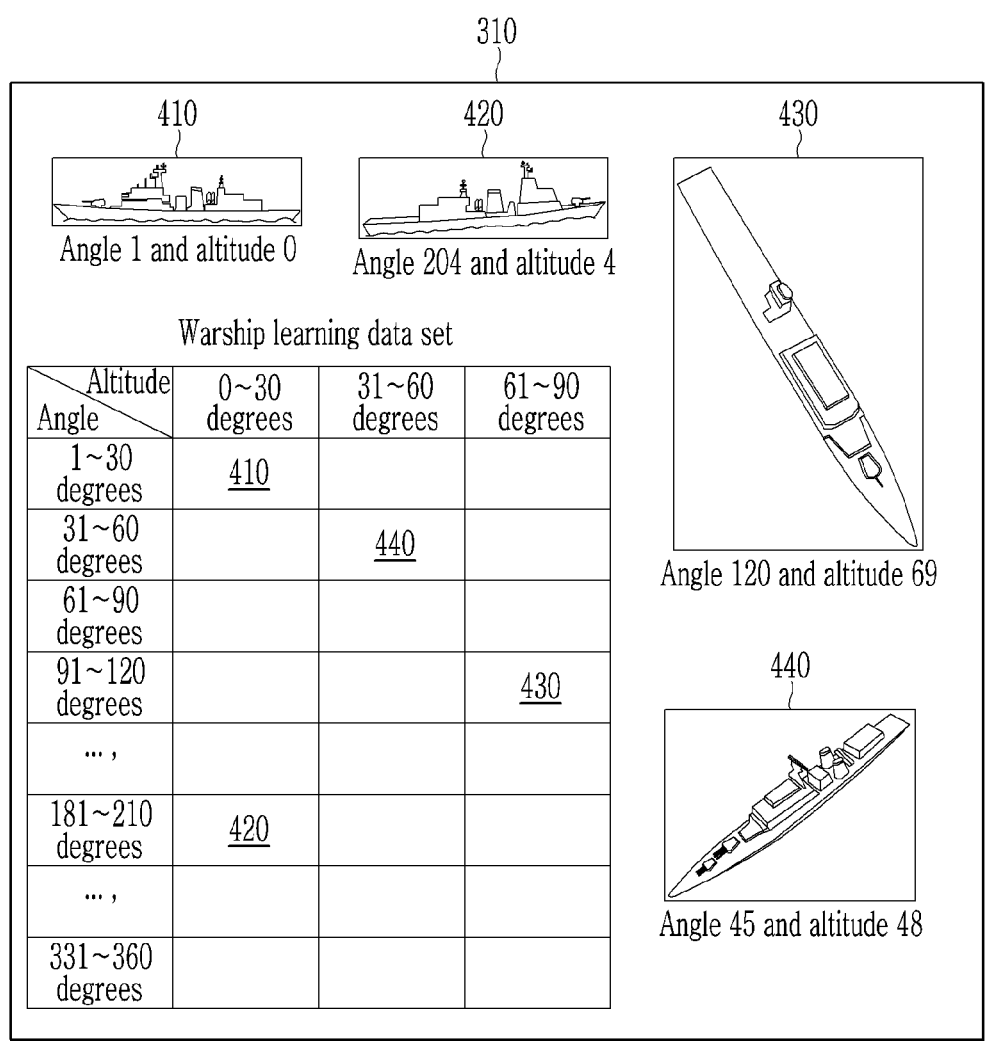
FIG. 4 is a diagram illustrating an example of learning data for estimating a photographing angle and photographing altitude according to an embodiment of the present invention.

FIG. 3 is a diagram illustrating a learning apparatus for estimating an angle and altitude according to an embodiment of the present invention, and FIG. 4 is a diagram illustrating an example of learning data for estimating a photographing angle and photographing altitude according to an embodiment of the present invention.

Referring to FIG. 3, the learning apparatus 300 for estimating angle and altitude includes a learning image collector 310, a learning database (DB) 320, and a learning controller 330.

The learning image collector 310 collects learning data to perform angle and altitude estimation. The learning data may include the warship images and information on the photographing angle and photographing altitude of the corresponding warship image. The learning image collector 310 divides the angle and altitude into each set angle unit based on any one side of the warship (for example, the right side), and generates the warship learning data set for various warship images for each angle and altitude combination class. For example, if angle and altitude are divided by 30 degrees from the right side of the warship, there are 12 angle classes and 3 altitude classes. Therefore, a warship learning data set consisting of a total of 36 angles and altitude combination classes can be generated.

Specifically, as shown in FIG. 4, the learning image collector 310 classifies the warship image 410 with a photographing angle of 1 degree and photographing altitude of 0 degrees into a combination class of angles of 0 to 30 degrees and altitude of 0 to 30 degrees, and the warship image 420 with a photographing angle of 204 degrees and a photographing altitude of 4 degrees into a combination class of angles of 181 to 210 degrees and altitude of 0 to 30 degrees. In addition, the learning image collector 310 classifies the warship image 430 with a photographing angle of 120 degrees and a photographing altitude of 69 degrees into a combination class of angles of 91 to 120 degrees and altitude of 0 to 30 degrees, and the warship image 440 with a photographing angle of 45 degrees and photographing altitude of 48 degrees into a combination class of angles of 31 to 60 degrees and altitude of 31 to 60 degrees. In this way, a warship learning data set is generated from a plurality of warship images for each angle and altitude combination class classified in this way, and the generated warship learning data set is stored in the learning DB 320. The learning is performed through a convolutional neural network (CNN) model suitable for image classification, such as ResNet or VGGnet, based on the images stored in the learning DB 320.

The learning controller 330 learns an angle and altitude estimation model using the warship images for each angle and altitude class stored in the learning DB 320.

Thereafter, the photographing direction estimator 210 may estimate ranges of an angle and altitude to which the input real warship image belongs using the learned angle and altitude estimation model.

Also, the photographing direction estimator 210 may specify the angle and altitude at which the warship is photographed by calculating the reliability and the class proportionally through n output classes with high reliability outputted from the learned angle and elevation estimation model.

Figure 5:
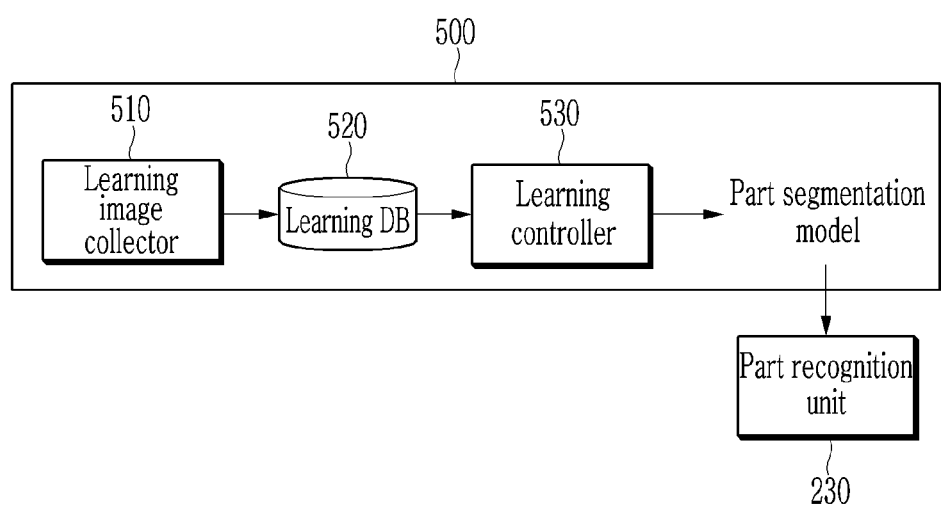
FIG. 5 is a diagram illustrating an apparatus for learning part segmentation according to an embodiment of the present invention.
Figure 6:
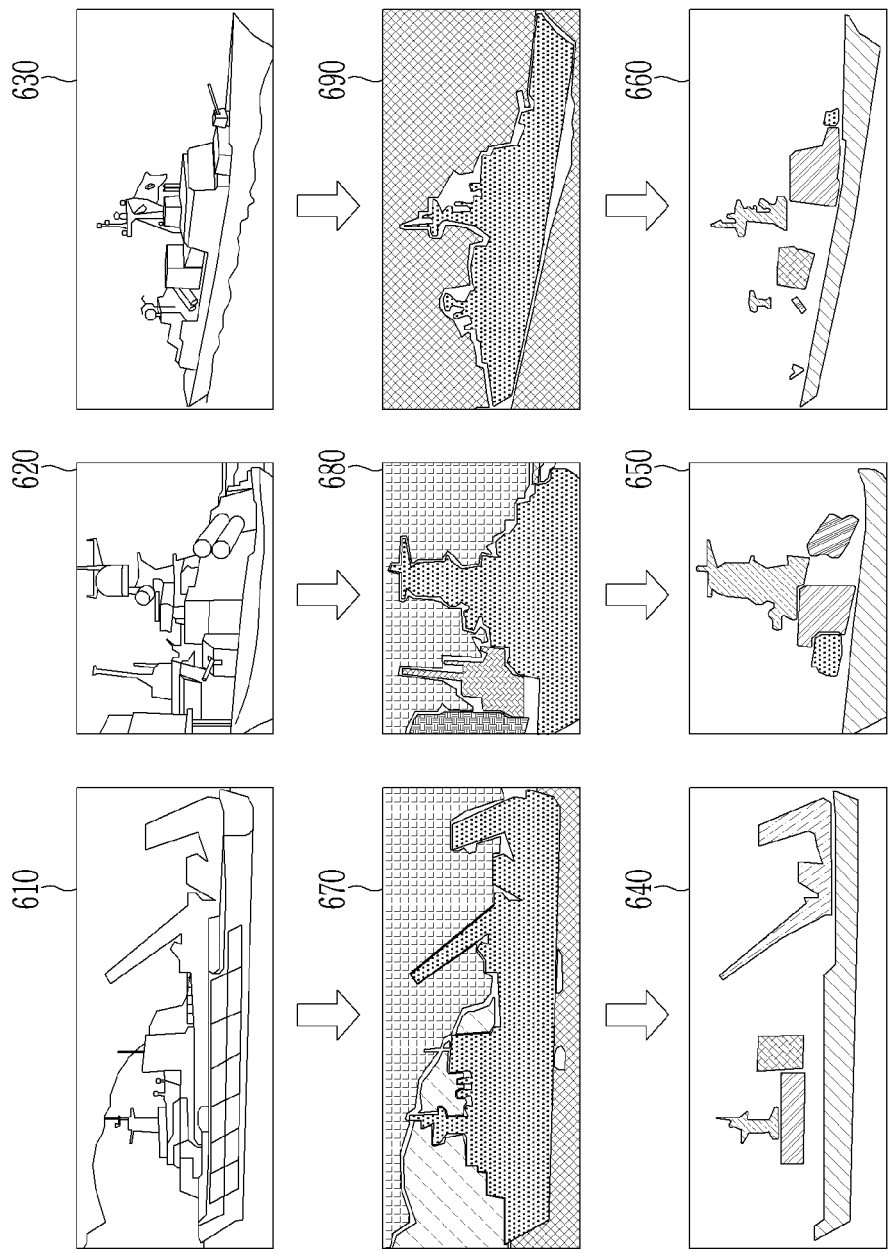
FIG. 6 is a diagram illustrating an example of learning data for part segmentation according to an embodiment of the present invention.

FIG. 5 is a diagram illustrating an apparatus for learning part segmentation according to an embodiment of the present invention, and FIG. 6 is a diagram illustrating an example of learning data for part segmentation according to an embodiment of the present invention.

Referring to FIG. 5, the apparatus for learning part segmentation 500 includes a learning image collector 510, a learning DB 520, and a learning controller 530.

The learning image collector 510 collects learning data to perform part segmentation. As the learning data, real learning data and virtual learning data may be used as the learning data for part segmentation. The real learning data may include warship images and part segmentation-labeled image data that classifies main parts of each warship image. In addition, the virtual learning data may include a 3D warship model set and a virtual warship part image set corresponding thereto. Since the virtual image inferring unit 220 uses the 3D warship model set and the virtual warship part image set previously produced, these data may be used as learning data. In order to recognize the main parts of the warship image, it is first necessary to define the main parts of the warship to be identified. The definition of the main parts of the warship is closely related to the amount of learning data to perform part segmentation and the complexity of the deep learning network.

Table 1 shows an example of defining the main parts of a warship for learning and testing part segmentation.

TABLE 1

| Classification ID | Type of part | Note | BGR |
| --- | --- | --- | --- |
| 0 | Hull | Warship | (0, 0, 255) |
| 1 | House | Warship | (15, 249, 227) |
| 2 | Cannon | Warship | (15, 249, 82) |
| 3 | Radar | Warship | (241, 252, 12) |
| 4 | Missile | Warship | (192, 8, 206) |
| 5 | Weapons | Warship | (69, 74, 145) |
| 6 | Flag | Warship | (69, 145, 145) |
| 7 | Helicopter | Warship | (84, 130, 97) |
| 8 | Convoy (Crane) | Warship | (132, 127, 82) |
| 9 | Chimney | Warship | (111, 102, 112) |
| 10 | Warship | Warship | (0, 255, 0) |
| 11 | Sea | Natural object | (255, 0, 0) |
| 12 | Sky | Natural object | (141, 73, 76) |
| 13 | Wake (Foam) | Natural object | (153, 61, 111) |

Main parts of the warship may be defined in advance as shown in Table 1, and the identification of each part may be expressed by color (BGR). The identification of each part may be expressed in a way other than color (BGR). For example, each part can be identified with a different hatch pattern. In this case, the colors shown in Table 1 may be replaced with hatch patterns.

The learning image collector 510 generates learning data for part segmentation. The learning image collector 510 collects a small amount of real learning data and a large amount of virtual learning data and stores the collected data in the learning DB 520. In this case, a domain adaptation process for matching the real learning data and the virtual learning data may be performed.

The learning controller 530 learns a part segmentation model using images stored in the learning DB 520.

As shown in FIG. 6, the learning data for the part segmentation includes each of the warship learning images 610, 620, and 630 and the labeled part segmentation images 640, 650, 660, 670, 680, and 690 for the corresponding warship learning images 610, 620, and 630. At this time, the images 670, 680, and 690 are intermediate images before the final part segmentation images 640, 650, and 660 are generated, and represent images obtained by separating the warship and the background for the part segmentation. In FIG. 6, for convenience, the main parts of the warship are distinguished using different hatch patterns. Different hatch patterns may correspond to different colors as defined in Table 1.

The learning controller 530 learns the part segmentation model by using the warship learning images 610, 620, and 630, the intermediate part segmentation images 670, 680, and 690, and the final part segmentation images 670, 680, 690. When the warship image is input to the part segmentation model, the part segmentation model identifies the warship area from the image, identifies the main parts only for the warship area, displays the identified main parts in each color, and finally outputs the part segmentation image.

The learning controller 530 learns the part segmentation model so that the part segmentation images 640, 650, and 660 in response to each of the warship learning images 610, 620, and 630 are output. Unified Perceptual Parsing for Scene Understanding (UPerNet), Pyramid Scene Parsing Network (PSPNet), DeepLab, etc. can be used as the part segmentation model. The part recognition unit 230 identifies each part for an input real warship image using the part segmentation model that has been learned through the above process, and outputs a part segmentation image. The part segmentation video is used to identify the type and class of the warship.

Figure 7:
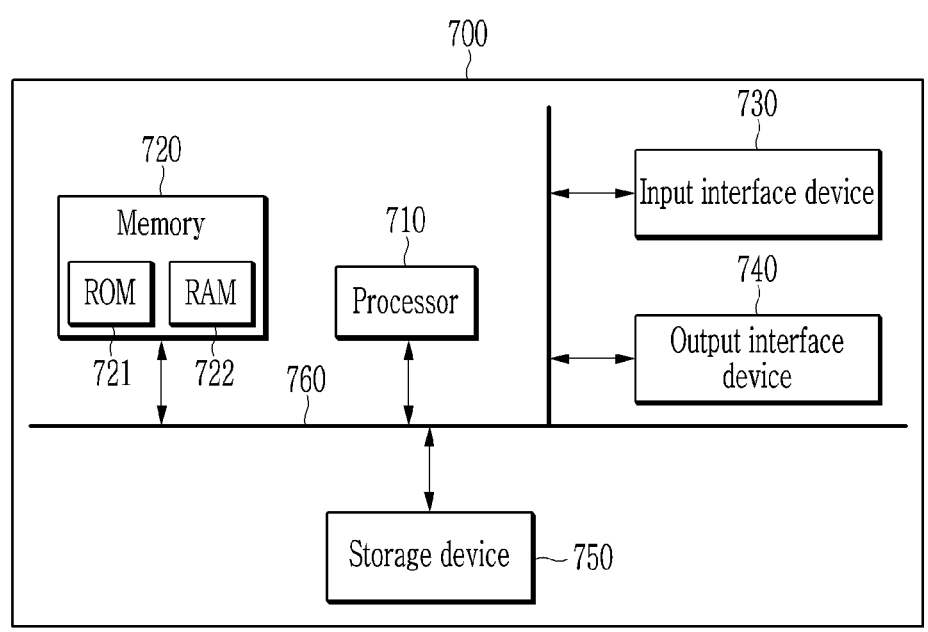
FIG. 7 is a diagram illustrating an apparatus for identifying a warship according to another embodiment of the present invention.

FIG. 7 is a diagram illustrating an apparatus for identifying a warship according to another embodiment of the present invention.

Referring to FIG. 7, the apparatus for identifying a warship 700 may represent a computing device in which the method for identifying a warship according to an embodiment of the present invention described above is implemented.

The apparatus for identifying warship may include at least one of a processor 710, a memory 720, an input interface device 730, an output interface device 740, and a storage device 750. Each of the components may be connected by a bus 760 to communicate with each other. In addition, each of the components may be connected through an individual interface or an individual bus centered on the processor 710 instead of the common bus 760.

The processor 710 may be implemented AS various types, such as an application processor (AP), a central processing unit (CPU), a graphical processing unit (GPU), etc., and may be any semiconductor device that executes commands stored in the memory 720 or the storage device 760. The processor 710 may execute a program command stored in at least one of the memory 720 and the storage device 750. This processor 710 may be configured to embody the functions and methods described based on FIGS. 1 to 6 above. For example, the processor 710 may be configured to perform at least some functions of the photographing direction estimator 210, the virtual image inference unit 220, the part recognition unit 230, and the similarity measurement unit 240 described in FIG. 2.

The memory 720 and the storage device 750 may include various types of volatile or nonvolatile storage media. For example, the memory 720 may include read-only memory (ROM) 721 and a random access memory (RAM) 722. In an embodiment of the present invention, the memory 720 may be located inside or outside the processor 710, and the memory 720 may be connected to the processor 710 through various known means.

The input interface device 730 is configured to provide data (e.g., A real-life warship image, etc.) to the processor 710, and the output interface device 740 is configured to provide data from the processor 710 (e.g., a ship identification result).

In addition, at least some of the method for identifying warship according to an embodiment of the present disclosure may be implemented as a program or software executed in the computing device, and the program or software may be stored in a computer-readable medium.

Furthermore, at least some of the method for identifying a warship according to an embodiment of the present disclosure may be implemented with hardware that can be electrically connected to the computing device.

According to an embodiment of the present invention, it is possible to identify a type and class information of a corresponding warship from a photographed real warship image.

In addition, since it identifies similar warships by considering the photographing direction and finally identifies the type and class information of the warship by comparing the similarity with the three-dimensional virtual warship models, it is possible to solve frequent misrecognition problems that may occur when identifying of similar object through general deep learning or image processing techniques, and it can be used for tactical applications in the field of defense using reliable identification.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by an expert skilled in the technical field to which the present disclosure belongs from the description of the above-described embodiments. The components described in the embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiments may be implemented by software, and the software may be recorded on a recording medium. The components, functions, and processes described in the embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiments may be implemented as a combination in a single embodiment. In contrast, various features described in the specification in the context of a single embodiment may be implemented in multiple embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiments in all embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for identifying a warship in an apparatus, the method comprising:
    receiving a real warship image;
    estimating a photographing angle and a photographing altitude from which the real warship image is obtained;
    generating a plurality of two-dimensional virtual warship images by applying the photographing angle and photographing altitude to three-dimensional warship images included in a pre-made three-dimensional warship model set, respectively;
    generating a plurality of virtual warship part images in which main parts are classified and displayed for each of the plurality of two-dimensional virtual warship images;

generating a part segmentation image in which main parts are classified and displayed for the real warship image; and outputting a type and class identification result of the warship by calculating similarity between each virtual warship part image and the part segmentation image, wherein the similarity is calculated by comparing feature information for each main part between each virtual warship part image and the part segmentation image.

2. The method of claim 1, wherein the estimating includes estimating ranges of photographing angle and photographing altitude of the warship from the real warship image using a learned model.

3. The method of claim 1, wherein the generating of the part segmentation image includes generating the part segmentation image by identifying main parts in the real warship image using a learned part segmentation model.

4. The method of claim 3, wherein the generating of the part segmentation image by identifying main parts includes:
identifying only a warship area from the real warship image;
identifying the main parts in the warship area; and
displaying the main parts to be distinguished.

5. The method of claim 4, wherein the displaying includes representing the main parts in different colors.

6. The method of claim 1, wherein the outputting includes:
outputting type and class information of the warship corresponding to at least one virtual warship part image having a similarity greater than or equal to a predetermined similarity.

7. The method of claim 6, wherein the feature information includes position relationship information.

8. An apparatus for identify a warship, the apparatus comprising:
a processor; and a memory having instructions stored thereon executed by the processor to perform:

a photographing direction estimator that estimates an angle and an altitude from which the warship is photographed from a real warship image;

a virtual image inference unit that generates:
a plurality of two-dimensional virtual warship images by applying the estimated angle and altitude to a plurality of three-dimensional warship models included in a pre-made three-dimensional warship model set, respectively, and
a plurality of virtual warship part images in which main parts are classified and displayed for each of the plurality of two-dimensional virtual warship images;

a part recognition unit that generates a part segmentation image in which main parts are classified and displayed for the real warship image; and a similarity calculator that calculates similarities between the real warship image and each two-dimensional virtual warship image, and outputs type and class information of the warship identified from the virtual warship image having a similarity greater than or equal to a predetermined similarity.

9. The apparatus of claim 8,
wherein the similarity calculator calculates the similarity by analyzing the positional relationship information for each main part between the part segmentation image and each virtual warship part image.

10. The apparatus of claim 9, wherein the parts recognition unit identifies the main parts in the real warship image by using a learned part segmentation model, and represents the main parts to be distinguished.

11. The apparatus of claim 8, wherein the photographing direction estimator estimates the angle and altitude at which the warship is photographed from the real warship image using a learned model.

* * * * *